UNITED STATES PATENT OFFICE.

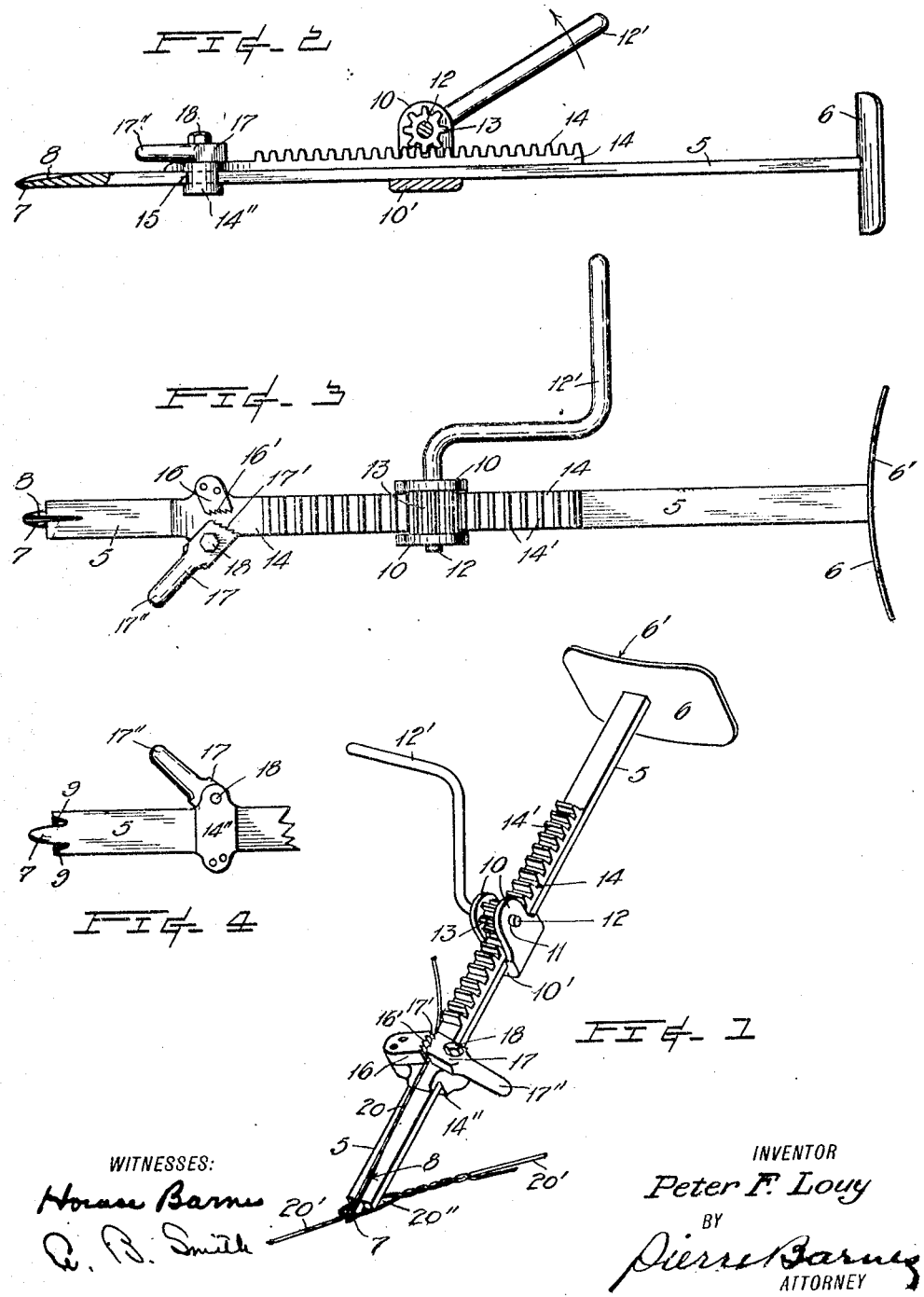

PETER F. LOUY, OF SEATTLE, WASHINGTON, ASSIGNOR OF ONE-HALF TO THOMAS KLEINOGEL, OF SEATTLE, WASHINGTON.

WIRE-STRETCHER.

No. 887,671.

Specification of Letters Patent.

Patented May 12, 1908.

Application filed November 5, 1907. Serial No. 400,832.

*To all whom it may concern:*

Be it known that I, PETER F. LOUY, a citizen of the United States, residing at Seattle, in the county of King and State of Washington, have invented certain new and useful Improvements in Wire-Stretchers, of which the following is a specification, reference being had therein to the accompanying drawings.

This invention relates to wire-stretchers; and especially to that class which are employed in banding boxes of merchandise or the like.

The principal object of the invention is the provision of an efficient implement of this nature which will be of relatively light weight, convenient to handle and powerful in action.

A further object is to produce an implement fulfilling the above characteristics, which will be of simple and inexpensive construction and the parts thereof so proportioned and disposed that it will be durable and not readily deranged and suited to withstand the rough usages to which such devices are subjected.

With these ends in view, the invention consists in the novel construction, adaptation and combination of parts, as will be hereinafter described and claimed.

In the drawings, Figure 1 is a perspective view of a wire stretcher embodying my invention; Fig. 2 is a side elevation of the same with portions broken away; Fig. 3 is a face view thereof; and Fig. 4 is a fragmentary view of the same.

The reference numeral 5 designates a bar which is desirably rectangular in cross section and is provided at one end with a transversely arranged curved plate 6 with the concave face 6' thereof outermost to afford a breast support for the operator's body. At the other end the sides of the bar are cut away, or the bar is formed, to furnish a protruding tongue 7 and extending longitudinally thereof from the extreme end and for some distance upon the body of the bar and upon the face side is a groove 8, while notches 9 are provided in the rear of the bar and extending from each side of the tongue, as shown in Fig. 4. Intermediate the length of said bar it is provided with forwardly extending ears 10 which are most conveniently formed upon a separate piece formed with a central portion 10' which is arranged to be riveted, or otherwise reliably secured to the bar. These ears are apertured, as at 11, to afford journal bearings for a rod 12 which is bent at the right-hand side to furnish a crank-handle 12'. Rigidly connected to the rod and between the aforesaid ears is a toothed-wheel, or pinion, 13 which is in continuous mesh with the teeth 14' of a rack-bar 14 slidably mounted upon the bar 5 and is retained in alinement therewith by said ears and the provision of a block 14'' integral with the bar 14 and in proximity of its lower extremity, and which block is apertured, as at 15, so as to accommodate the bar 5 with a sliding fit. To this rack-bar and adjacent of the lower extremity, as upon said block, is a wire clamping device comprised, desirably, of a stationary jaw 16 and a dog 17 which is pivoted to the ratchet-bar by a bolt 18. The opposing faces 16' and 17' of the jaw and dog are serrated to afford an effective grip upon the wire which is to be stretched.

The operation of the invention may be explained as follows: The wire 20', which is provided with a loop 20'' at one end, is first passed about a box and its other end 20 threaded through said loop. The tongue 7 is then inserted through the wire loop so as to engage with the box and the end 20 of the wire introduced between the jaw 16 and the dog 17 when the rack carrying these elements is positioned at the end of its travel toward the bar-tongue. A finger pressure exerted upon the dog-handle 17'' will affect the dog to clamp the wire and is thus maintained until a tension is put upon the wire through the recedence of the rack-bar by turning the handle 12' and through the office of the pinion 13. When the wire has been properly stretched by the continued turning of the crank-handle, the implement is then tilted forwardly to bend the wire part 20 into a bight about the loop, and the implement may then be disengaged by the release of the dog 17 through a contrary movement of the operator's fingers upon the dog-handle 17''. The referred to bight of the wire is then made more acute by striking the same with the edge of the plate 6 employed as a hammer with the bar 5 serving as the handle thereof in such action. The operation of wire stretching is thus completed and the free end of the wire, that is, the part 20 is then coiled about the main portions by other devices which have nothing to do with the present invention.

In banding boxes, the implement would ordinarily be grasped by the left hand and the dog actuated by the thumb of this hand while the right hand would operate the crank-handle to accomplish the stretching of the wire. Ordinarily such holding of the implement would be all that is required, but in exceptionally heavy work the operator's body is brought to bear against the plate 6.

The provision of the groove 8 serves to lead the free end of the wire in a straight line from the point of the tongue to the clamping devices, and the groove 9 take the wire of the loop and permit the bar 5 to be brought into close relation with the box to be banded.

What I claim as my invention, is—

1. An implement of the class described comprising a bar provided at one of its ends with a protruding tongue having a groove on one side extending into the bar, a rack-bar slidably connected with the aforesaid bar, a pinion supported by the first named bar and in continuous mesh with the rack-bar, means for rotating said pinion, and wire clamping means carried by the rack-bar the wire being received in the groove in said tongue and bar.

2. An implement of the class described comprising a bar provided at one of its ends with a protruding tongue grooved longitudinally on one face, the groove extending into the bar, a rack-bar slidably connected with the aforesaid bar, a pinion supported by the first named bar and in continuous mesh with the rack-bar, means for rotating said pinion, wire clamping means carried by the rack-bar and comprised of a fixed jaw and a dog the said groove in the tongue and bar receiving said wire.

3. An implement of the class described comprising in combination, a bar provided at one end with a tongue and at the other end with a breast plate, the tongue being grooved longitudinally on one face and the bar being provided on the opposite face at the base of the tongue with notches an attachment fixedly connected with the bar intermediate the length of the latter, a rack-bar slidably mounted upon the first named bar, a pinion, a rod provided with a crank-handle and carrying the pinion, said rod being journaled in said attachment, a serrated jaw fixedly connected with said rack-bar, and a serrated dog pivotally connected with said rack-bar.

4. In an implement of the class described, the combination with a bar having a protruding tongue at one end, said bar being provided upon one of its faces with a groove extending from the point of said tongue to some distance therefrom upon the bar, and being also provided upon the opposite face with two notches disposed upon the opposite sides of the tongue, and apertured ears extending from said bar; of a crank-rod extending through the apertures of said ears, a pinion fixedly mounted upon the rod intermediate of the ears, a rack-bar slidably mounted upon the first named bar and having its teeth engaged by said pinion, a jaw fixedly secured to the rack-bar, and a dog pivotally connected with the rack-bar and adapted to coöperate with said jaw.

5. In an implement of the class described, the combination with a bar having a curved breast plate at one end and a protruding tongue at the other end, said bar being provided upon one of its faces with a groove extending from the point of said tongue to some distance therefrom upon the bar, and being also provided upon the opposite face with two grooves disposed upon the opposite sides of the tongue, and apertured ears extending from said bar; of a crank-rod extending through the apertures of said bars, a pinion fixedly mounted upon the rod intermediate of the ears, a rack-bar slidably mounted upon the first named bar and having its teeth engaged by said pinion, a block inclosing the first named bar and integral with the rack-bar, a jaw fixedly secured to the rack-bar, and a dog pivotally connected with the rack-bar and adapted to coöperate with the said jaw.

In testimony whereof I affix my signature in presence of two witnesses.

PETER F. LOUY.

Witnesses:
SIERRE BARNES,
ROBT. B. GILLIES.